US006153666A

United States Patent [19]

Lagace

[11] Patent Number: 6,153,666

[45] Date of Patent: Nov. 28, 2000

[54] RADIATION-ATTENUATING SHEET MATERIAL

[75] Inventor: Arthur Lagace, Newtonville, Mass.

[73] Assignee: Bar-Ray Products, Inc., Littlestown, Pa.

[21] Appl. No.: 09/116,684

[22] Filed: Jul. 16, 1998

[51] Int. Cl.$^7$ .............................. G21F 1/10; C08K 5/36; C08K 5/48

[52] U.S. Cl. .......................... 523/136; 524/283; 524/409; 524/413; 524/424; 524/427

[58] Field of Search .................................... 524/283, 409, 524/413, 424, 427

[56] References Cited

U.S. PATENT DOCUMENTS

| | | | |
|---|---|---|---|
| 4,891,399 | 1/1990 | Ohkawa et al. | 523/200 |
| 5,245,195 | 9/1993 | Shah et al. | 250/515.1 |

*Primary Examiner*—Kriellion Sanders
*Attorney, Agent, or Firm*—Barry G. Magidoff

[57] ABSTRACT

The invention provides metal loaded polymeric sheet material suitable for the preparation of protective garments for the protection of workers or subjects exposed to x-radiation.

9 Claims, No Drawings

RADIATION-ATTENUATING SHEET MATERIAL

This invention relates to a metal loaded polymeric sheet material suitable for the preparation of protective garments for the protection of workers or subjects exposed to x-radiation. The sheet is intended to attenuate x-ray radiation to an extent substantially equal to or greater than with use of an equivalent amount of lead.

BACKGROUND OF THE INVENTION

It is well known to use metal-loaded polymer sheets in the production of protective, radiation attenuation garments for workers likely to be exposed to x-ray radiation or for the subjects, e.g., patients, exposed to x-radiation. The most commonly used metal continues to be lead. However, it is also recognized that lead has certain properties, including its toxicity, which renders it less than the optimum filler material for polymers. As a result, other materials have been proposed to be used either as partial or total replacement for lead. Such materials include, particularly, barium sulfate, or other barium salts, tin, boron or its compounds, bismuth compounds, or other heavy metals, including antimony, bismuth, gold, thallium, tantalum, uranium, zirconium, or non-metals, such as iodine. Barium sulfate has been a greatly preferred attenuant, see U.S. Pat. Nos. 5,245,195, 4,938,233, 5,801,807, and 4,203,886. It has also been known to use combinations of barium sulfate with, for example, a bismuth salt, tungsten salt, tin powder, aluminum powder, especially where the barium sulfate is at least 50% of the x-ray attenuating component.

A wide variety of polymeric sheet materials have also previously been used as the substrate or matrix for the metal loading. Such polymers include thermoplastic materials, such as polyolefins, such as polyethylene and polypropylene, vinyl polymers, such as polyvinyl chloride or vinyl acetate copolymers, acrylic polymers, such as polymethylenthacrylate, or thermoset polymers or elastomers, such as silicones, urethane polymers, or other elastomeric materials, rubbery polymers, including SBR rubber (stylene-butadiene rubber), styrene-isoprene rubber, polybutadiene, polyisoprene, butyl rubber and the like, or epoxy polymers.

SUMMARY OF THE INVENTION

In accordance with the present invention, it has now been found that the specific combination of barium carbonate and tin and/or antimony powder provides a significantly greater attenuating effect, based on a relative weight value, than other combinations of non-lead materials.

It has also been found that by utilizing a particular platicizer and polymer, a more uniformly effective shield can be provided; the production of the sheet material is greatly improved, and the production costs are reduced.

These metal-loaded polymers provide a highly useful x-ray attenuation shield and can be produced in an almost limitless variety of shapes and sizes. They can be used in the production of x-ray attenuation garments, or simple sheet materials, but preferably garments such as aprons and gloves. These items can be worn by the technicians operating the x-ray equipment, or by patients, to cover those portions of the body which are not intended to be subjected to the x-ray radiation.

Generally, in forming the sheet material of this invention, the attenuating material, whether elemental metal or metal compound, is mixed into a polymer mixture and then formed into the desired film, sheets, or molded shapes. It has been found as a result of this invention that the combination of powdered elemental tin or antimony and barium carbonate mixed into a polymer matrix, is extremely effective in attenuating x-rays over a range of radiation intensities. The tin and the barium carbonate salts are preferably mixed in a range of from 1.5-to-1 to 1-to-1.5 by weight, and preferably, in substantially equal amounts. The two ingredients preferably have a particle size not greater than 100 mesh, and most preferably not greater than 150 mesh. The barium salts are generally available only at finer grain sizes. Barium carbonate has not previously been the preferred compound of choice for the providing of the barium element into such a mixture, because of its relatively low density, fineness of grind, and surface chemistry (which tended to increase oil absorption). These deficiencies were apparently overcome by the high efficiency of the barium when mixed in the composition of this invention.

The polymer matrix can be any of a variety of polymers, including both thermoplastic and thermosetting polymers. The polymers which can be mixed with the barium carbonate/tin (or antimony) radiation attenuating composition include polyethylene, polypropylene, vinyl polymers, e.g., polyvinyl chloride, elastomers such as natural and synthetic rubbers, such as SBR rubber, urethane polymers, polyesters, nylon, and polyvinylidene chloride. The method of manufacturing the product will generally depend on the type of polymer used. For example, when utilizing a polyolefinic matrix, the attenuating formulation of powdered material and the polymer are pre-blended by hot mixing in a compounding extruder or a Banbury mixer/granulator. The desired shape, whether a film, sheet, or molded material, can then be prepared by injection molding, extrusion, or calendaring. Similarly, filled elastomeric polymer matrices can be prepared by a similar process, wherein the pre-mix with a pre-polymer is prepared in a Banbury or Sigma mixer. A sheet material can be formed by calendaring, and other shapes by compression molding.

When utilizing vinyl polymers, such as polyvinyl chloride, to form the polymer matrix, the attenuating material is preferably mixed into a plastisol dispersion comprising the polymer and a desirable plasticizer. The plasticizer is one which must be compatible with PVC and it must be absorbed by the polymer during the heating and mixing process, causing the polymer to swell and soften; in addition, it must be a compound that is also compatible with the attenuating material components, e.g., barium carbonate and the tin powder. Commonly used plasticizers include phthalates, such as dioctyl phthalate (DOP), and di-isononyl phthalate (DINP); dioctyl adipate (DOA) is also a useful plasticizer. Other plasticizers include tricresyl phosphate (TCP), octyldiphenyl phosphate, trioctyl phosphate, butyl benzyl phthalate, dioctyl sebacate, trioctyl trimelliate (TOTM), triisononyl trimellitate (TIOTM), and epoxidized soya and linseed oils.

Although antimony can be used in place of tin powder, that element is generally used as a compound, such as antimony oxide.

When forming the polymer matrix, generally it is useful to add dispersion aids into the polymer mixture in order to assist in dispersing the powders and maintaining as low a viscosity as possible. Dispersion aids are, basically, surface active chemicals or surfactants/ Dispersants have been previously used for mixing pigments, fillers and the like into polymers, rubbers, cements and related products. There are literally hundreds of surfactants. Among the large number of previously known surfactants, polyethylene glycol (PEG)

derivatives and other surfactants are known to be effective. Depending on the formulation, 0.5–1.5 pph of a surfactant will generally lower the viscosity by 30–40%. Some commonly used PEG materials include: Lubrizol 7315 G and 2152, Witco Chemical No. 14165, and Surfynol 104. Long chain non-ionics, amides or unsaturated polycarboxylic acid polymers and long chain polyacrylates have been found to be useful. When using a plastisol, a useful dispersion aid is known as BYK-1142, a proprietary material, sold by BYK-Chemie USA, which is known to include a polar acidic ester of long chain alcohols. In addition, it has been found that materials that are not commonly used in PVC formulations, such as triethylene glycol esters, especially the diesters, e.g., triethylene glycol bis (2-ethyl hexanoate)), or "teg," are highly effective for the purposes of this invention. Although such surfactants are more commonly used in rubber compounding, it has been found to be effective for the PVC matrix formulations in this invention.

Preferred PVC polymers have a molecular weight of preferably at least 90,000; most preferably at least 110,000, as measured by inherent viscocity, in accordance with ASTHD 1243 (Method A). The polymer preferably has a molecular weight of not greater than 500,000 and most preferably not greater than 260,000.

The plastisol is usually mixed in double planetary mixers, e.g., by Hobart, as well as a Cowles mixer, or similar equipment from Robbins-Myers and Shar, at room temperature. Generally the temperature is not heated to above 100° F. After the plasticized polymer and attenuating materials have been pre-mixed, the resulting plastisol can be formed into a shaped article by a variety of techniques. Because the plastisol is of a relatively low viscosity compared to the pre-mix for other thermoplastic polymers, casting is the most common forming technique for such PVC sheeting from plastisol. The plastisol liquid is drawn under a knife on release paper, forming a layer as thin as 0.02 inch in thickness, usually at room temperature and preferably not greater than about 100° F. The paper then passes through a heated oven at 300–400° F., where the liquid fuses (by gelling), and the PVC sheet is then stripped from the paper and can be cut to the desired shape for forming the attenuation clothing. The liquid plastisol can also be molded into more complex shapes, such as gloves, by being pumped into heated molds having an inner and an outer mold surrounding the hot plastisol, or a mold surface can be used where the hot mold is dipped into the plastisol liquid and the liquid fuses on the surface of the mold. The mold can then be removed from the plastisol and the fused article stripped from the mold after cooling.

The following examples present preferred embodiments of the present invention, but are not to be considered exclusive of the scope of the invention.

EXAMPLE 1

The following formulation was formed as a plastisol in a Hobart double planetary mixer:

- Metallic Tin Powder (ACuPowder-Grade 5325, 200 mesh): 127.5 pounds
- Barium Carbonate Powder (CPC photographic grade): 127.5 pounds
- Dispersion Grade PVC (Geon 120×400 grade): 20 pounds
- Plasticizer (TEG): 18 pounds
- Dispersing Agents (BYK-1142): 2 pounds The above plastisol mixture, after being uniformly mixed, is cast into sheets having a thickness of 0.02 inch and cut into test squares measuring 4.5 inches square.

The cut squares were tested in accordance with the following protocol:

The sample to be tested is placed between the output beam from a standard medical x-ray generator and a detector, thus exposing it to x-ray radiation of known properties.

The sample is placed on a lead test shelf that is 23 inches below the x-ray tube and 13 inches above the detector. The shelf has a 2-inch diameter opening. The test sample is a 4.5-inch square. For non-lead attenuating materials, the beam energy is set to 100 Kvp, at 100 milliamperes, and exposure times set to 1 second for a one layer test.

The sample is exposed to the x-rays and the non-absorbed energy, i.e., the x-ray energy passing through the sample, is measured. An x-ray exposure meter is used to measure the non-absorbed beam energy. Specifically, the exposure meter used is a Keithley, 45060, MR machine. To measure the Kv output, a KVP III Digital meter is employed.

The performances of pure lead control samples, of known attenuation effectiveness, are measured by this same procedure. The lead controls are selected to have attenuation just above, just below, and approximately the same as, the attenuation of the test piece. The performance of the sample is compared to the known lead controls and the exact attenuation of the sample is calculated via interpolation.

It was found that 78 grams of the 4.5 inch squares were required to achieve the same attenuation at 90 Kvp, as a lead foil 0.5 mm thick. When PVC matrix attenuation products are formed utilizing 100% lead powder, a standard weight of 85.5 grams of such squares is required. Thus, the same attenuation effectiveness was provided with a weight savings of 8.8%, utilizing the barium carbonate/tin containing matrix. For an unknown and unexpected reason, this was 7% lighter in weight than theoretical projections would expect.

EXAMPLE 2

A similar product was tested at 100 Kvp and was found to provide the same effect as 85.5 grams of the lead filled matrix by utilizing 77.5 grams of the test square film.

EXAMPLE 3

The following formulation was formed as a plastisol in a Hobart double planetary mixer:

- Metallic Tin Powder (ACuPowder-Grade 5325): 900 grams
- Barium Carbonate Powder (CPC Photographic grade): 600 grams
- Dispersion Grade PVC (Geon 120×400 grade): 75 grams
- Plasticizer (TEG): 75 grams The above sample was mixed, as in Example 1, above, and the 0.02 inch thick sheet material was then formed. When tested at 90 and 100 Kvp, it was found that a weight of 75.6 grams of the test square had a lead equivalent of 0.487, which presented a result almost 6% better than expected.

In addition to obtaining unexpectedly good results utilizing the combination of barium carbonate and tin powder, it has been found that by the use of the preferred plasticizer and dispersing agent, the effectiveness of a more traditional lead/barium sulfate attenuation composition was enhanced.

EXAMPLE 4

The following formulation was prepared, cast and tested as in Example 1:

- Metallic Lead Powder (200 mesh): 300 grams
- Barium Sulfate Powder (Polar Mineral 2010): 300 grams Dispersion Grade PVC (Geon 120×400): 60 grams Plasticizer (TEG): 15 grams Dispersing Agent (DINP): 60 grams plus BYK-1142: 8 grams Although this combination did not achieve a lead equivalent superior to that of the earlier formulations, the formulation did have 13½% less attenuating elements by weight than the all-lead formulation. That is, the combination of lead powder and barium sulfate required 93.7 grams of material (including the polymer), versus 85.5 for the all-lead formulation. Furthermore, this resulted in a 20% improvement over theoretical projections for the barium sulfate/lead combination.

What is claimed is:

1. A metal-filled polymer matrix material having x-ray radiation attenuation effectiveness, comprising a polymer matrix and, dispersed in the polymer matrix, the combination of a particulate metal element selected from the group consisting of tin and antimony, and barium carbonate salt, the polymer matrix comprising a plasticized, nonelastomeric polymer.

2. The composition of claim 1, wherein the element is metallic tin powder, and the tin and barium carbonate are present in a ratio by weight of 60/40 to 50/50.

3. The composition of claim 2, wherein the ratio of the tin to the barium carbonate is 50/50.

4. The composition of claim 1, wherein the polymer is selected from the group consisting of polyvinyl chloride polymers, polyolefins, and polyester polymers.

5. The composition of claim 4, wherein the polymer is a polyvinyl chloride, plasiticized with a triethylene glycol ester.

6. A radiation attenuating polymeric material comprising a mixture of a barium salt and a high atomic weight metal powder uniformly dispersed through a plasticized polymer matrix, the plasticized polymer matrix comprising dispersion grade polyvinyl chloride, and a plasticizer-surfactant comprising triethylene glycol ester.

7. A process for the manufacture of the product of claim 6, comprising dispersing a powder, which comprises the combination of a metallic element and barium carbonate uniformly through a dispersion grade PVC plastisol and forming the uniform plastisol mixture into an x-ray radiation attenuating product by fusing the plastisol at a temperature of at least about 300° F.

8. The process of claim 7, wherein the plastisol comprises polyvinyl chloride polymer and a plasticizer comprising an ester of triethylene glycol.

9. The process of claim 8, wherein the metal element is selected from the group consisting of lead, tin and antimony.

* * * * *